May 5, 1959

D. R. ANDREWS 2,885,488

MAGNETIC RECORD TRANSDUCER

Filed Sept. 30, 1952

INVENTOR.
Dallas R. Andrews

BY Morris b. Rabkin

ATTORNEY 2,885,488
Patented May 5, 1959

2,885,488

MAGNETIC RECORD TRANSDUCER

Dallas R. Andrews, Collingswood, N.J., assignor to Radio Corporation of America, a corporation of Delaware Application September 30, 1952, Serial No. 312,354

7 Claims. (Cl. 179—100.2)

This invention relates to magnetic recording, and more particularly to an improved magnetic record transducer and a system employing the same.

In the art relating to sound recording it has become a general practice to make the initial recordings on a magnetic record member. Only the acceptable "takes" are transferred to the ultimate record member, whether that record member be an optical sound track on a motion picture film or some other sound record. Of particular interest in the instant case is the transfer of the sound record to the optical sound track of a motion picture film.

When sound is recorded on an optical sound track using the well known variable area technique it is desirable to provide means for inserting a "noise-suppression" control into the recording process.

It is, accordingly, an object of the present invention to provide an improved transducer of novel construction, and one wherein an anticipatory signal may be developed which is suitable for use to obtain a noise suppression control signal.

It is another object of this invention to provide improved means for transcribing recordings from a magnetic record member and including time delay means for obtaining anticipatory signals.

In accomplishing these and other objects there has been provided, in accordance with this invention, a novel transducer having two spaced and independent signal translating gaps. There is a signal pick-up coil associated with each of said gaps. A signal induced in one of the pick-up coils is used as an anticipatory signal in anticipation of the development of a corresponding signal across the second gap.

Figure 1:
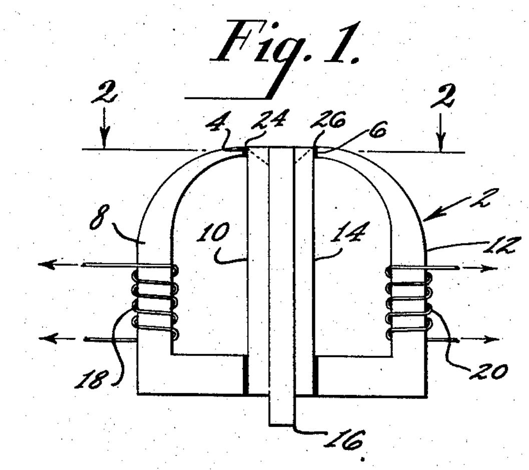
Figure 2:
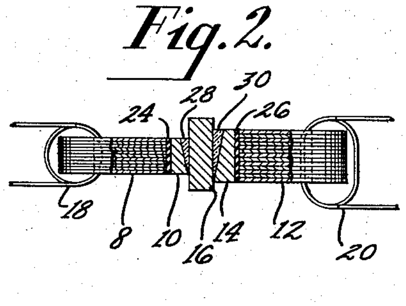
Figure 3:
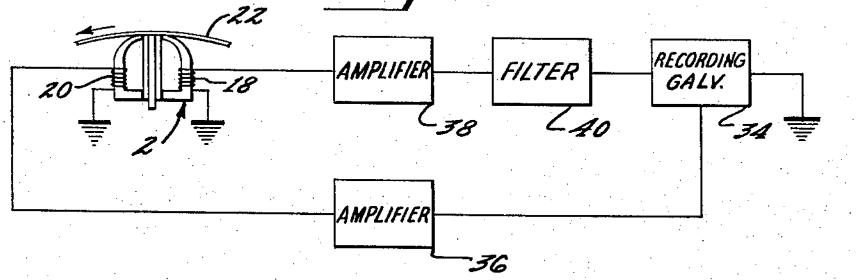

A better understanding of this invention may be had from the following detailed description when read in connection with the accompanying drawing in which:

Fig. 1 is an elevational view of a transducer constructed in accordance with the present invention, Fig. 2 is a view, partly in cross-section, taken along the line 2—2 of Fig. 1 as viewed in the direction of the arrows, and, Fig. 3 is a schematic diagram of a circuit embodying the present invention.

Referring now to the drawings in more detail, there is shown in Fig. 1 a transducer 2. The transducer is unique in that it has two signal translating gaps 4 and 6. One of these gaps 4 is defined by the terminus of a curved leg 8 of the core of the transducer and a straight leg 10 of the core. The second gap 6 is defined by the terminus of a second curved leg 12 and a second straight leg 14. The two straight legs 10 and 14 are positioned facing each other but separated by a shielding spacer 16.

A first signal pick-up coil 18 is placed on and inductively coupled to the first curved leg 8. A second signal pick-up coil 20 is placed on and inductively coupled to the second curved leg 12.

The shielding spacer 16 may be made of any suitable material. However, copper has been found to be satisfactory. The function of the shielding spacer is the magnetic isolation of one half of the transducer 2 from the other half. As may be seen in the drawings, the spacer 16 is wider than the core members of the transducer and extends beyond the end of the transducer on the end remote from the signal translating gaps. The spacer is flush with the ends of the core members so that a tape record member 22 may pass smoothly across both of the gaps.

In a preferred form of the transducer, the curved legs 8 and 12 are formed of laminated material as illustrated in Fig. 2. The straight legs 10 and 14 may also be laminated but they are preferably made of solid material. The entire transducer may, after assembly, be potted in a block of plastic and encased in a shield-housing (not shown).

A suitable gap spacer 24 and 26 is placed in each of the signal gaps 4 and 6. These spacers are of well known form, being made, for example, of beryllium copper. For reasons to be hereinafter explained, the portion of each of the straight leg members 10 and 14 which faces the shielding spacer 16 is cut away in the vicinity of the record contacting surface. This produces beveled recesses which, when the transducer is potted as above suggested, will be filled with the potting plastic 28 and 30.

In operation, the transducer 2 is connected into a circuit with the first pick-up coil 18 providing an anticipatory signal for the system, while the second pick-up coil 20 provides the function signal for the system. In the example chosen for illustrative purposes, the function is that of modulating a recording light beam by vibrating the mirror of a recording galvanometer 34. Thus, the second signal coil 20 is connected, through an amplifier 36, directly to the galvanometer 34. The first coil 18, on the other hand, is connected through an amplifier 38 to a rectifying filter or detector 40. The output of the filter 40 is connected to the galvanometer 34.

When it is desired to transcribe a recording from an original record member to an ultimate record member such as an optical sound track using the well known variable area recording technique, it is further desirable to provide so-called noise-suppression. A more complete description of noise-suppression and illustrative applications thereof are given in the text book entitled "Elements of Sound Recording," by Frayne and Wolfe, published by John Wiley and Sons, at pages 372 and 382 to 403. In the technique of applying noise suppression, a control signal proportional to the amplitude of the recorded signal is obtained and applied as bias to the light modulating means. At substantially the same time, the signal to be recorded is also applied to the light modulating means. Since the control signal must be converted from an audio frequency signal to a relatively slowly fluctuating direct current signal, an appreciable amount of time is consumed, with the result that the signal to be recorded, the function signal, must be delayed so that the two signals may be applied to the light modulating means in substantial coincidence. In one system of recording, the time that the function signal must be delayed is about 10 milliseconds. To achieve such a time delay electronically, and without distorting the signal, a bulky, complicated and expensive network is required. With a transducer constructed in accordance with the present invention, the time delay is effected by the spacing between the two signal translating gaps. Thus, if the speed at which the record member is driven is 18 inches per second, and the desired time delay is 10 milliseconds, then the two gaps will be separated by a distance of 0.18 inch. Such a spacing would be substantially impossible if two conventional playback heads were to be used due to the size and configuration of the heads.

Thus, in accordance with the present invention, the record member, here represented by the tape 22, traveling in the direction indicated by the arrow, passes first over the gap 4 and then over the gap 6. When the tape, bearing a sound record, passes over the gap 4, a signal corresponding to the sound record is induced into the coil 18. This signal is amplified by the amplifier 38 and applied to the filter 40. In the filter, the signal is first rectified and then filtered to produce a direct current signal which varies in value in accordance with the amplitude of the signals corresponding to the sound record. This varying direct current signal is applied as bias to the light modulating means represented in Fig. 3 by a recording galvanometer 34.

A predetermined time, for example 10 milliseconds, after a particular point on the record member passed the first signal gap 4, the same point passes the second gap 6. Then a corresponding signal is induced into the second signal pick-up coil 20. That signal is amplified in the amplifier 36 and fed to the recording galvanometer 34 in substantial coincidence with the corresponding bias signal.

In Fig. 2, it will be noted that one core section is thicker than the other. The thinner of the two sections, members 8 and 10, is the section in which the anticipatory signal is to be developed, while the thicker section, members 12 and 14, is the section in which the function signal is to be developed. The section which develops the anticipatory signal need not be as sensitive as the other section. Therefore, the reduced sensitivity is achieved by reducing the lateral dimension. This reduction in the lateral dimension also serves to render the alignment of the two heads less critical.

Since the two straight leg members 10 and 14 are separated by the shielding spacer 16, cross talk between the two sections of the transducer is substantially eliminated. Such cross talk as would occur without the shield has been found to be largely a result of air-core transformer action. Thus, the conductive shield placed in the field between the two sections develops eddy currents which dissipate the flux which would have linked the two sections producing cross talk.

As was previously indicated, the portions of the straight leg members 10 and 14 which face the spacer 16 are cut away in the vicinity of the record contacting surface to produce beveled recesses 28 and 30. Since magnetic signals on a record member cannot recognize the difference between a signal gap and a spurious gap, if the edges of the leg members were straight and parallel where they are contacted by the record member, they would constitute a spurious gap, and a spurious signal might be produced thereacross. However by bevelling the edges so that they are not parallel, any signal developed thereacross would be insignificant.

Thus, it may be seen that there has been provided an improved means for transcribing signals recorded on a magnetic record member while providing means for obtaining anticipatory signals which may be used to control the reproduction of the signals.

What is claimed is:

1. A magnetic record transducer having a first signal translating section, a second signal translating section, and means for isolating said sections with respect to each other, said isolating means including a strip of electrically conductive material placed between said translating sections, and said translating sections each having a beveled surface to present non-parallel edges adjacent to said isolating means.

2. The invention as set forth in claim 1 wherein one of said translating sections is thicker than the other of said sections.

3. A magnetic record transducer having a first signal translating section defining a first magnetic circuit, a second signal translating section defining a second magnetic circuit, said sections being arranged in tandem means for electromagnetically isolating said magnetic circuits with respect to each other, each of said sections comprising a leg member of magnetic material having a planar surface and another leg member of magnetic material having opposite end faces, said end faces abutting said planar surface at spaced positions along said surface to define a signal gap and another gap, adjacent edges of said members defining the end of said signal gap which is exposed for magnetic contact with a magnetic record member, each of said sections constituting a closed loop core structure, and a signal pick-up coil on each of said core structures.

4. A magnetic transducer having a first signal translating section defining a first magnetic circuit, a second signal translating section defining a second magnetic circuit, said sections being arranged in tandem, means for electromagnetically isolating said magnetic circuits with respect to each other, each of said sections comprising a straight leg member of magnetic material and another leg member of magnetic material having opposite ends abutting one surface of said straight leg member to define a substantially closed loop core section, said closed loop core section having gaps between said one surface and said abutting ends of said other member, one of said gaps providing a signal gap adapted to be disposed for magnetic contact with a record member, said core sections being assembled with the surfaces of said straight members opposite to said one surface spaced from and adjacent to each other, said surfaces being separated by said isolating means, and said isolating means comprising a member of conductive material having planar surfaces on opposite sides thereof, said planar surfaces of said isolating means member being disposed in juxtaposition with different ones of said other surfaces.

5. A magnetic transducer having a first signal translating section and a second signal translating section, each of said sections defining a magnetic circuit means for electromagnetically isolating said magnetic circuits with respect to each other, each of said sections comprising a curved leg member and a straight leg member constituting a substantially D-shaped core section, said core sections being assembled in tandem with the straight members adjacent each other and being separated by said isolating means, said isolating means comprising a strip of electrically conductive material.

6. The invention as set forth in claim 5 wherein said conductive strip is copper.

7. A magnetic transducer having a first signal translating section and a second signal translating section, means including a strip of copper for electromagnetically isolating said sections with respect to each other, each of said sections comprising a curved leg member and a straight leg member constituting a substantially D-shaped core section, said core sections being assembled with their straight leg members on opposite sides of and adjacent to said copper strip, one end of said assembly constituting a record medium contacting surface, said straight leg members being laterally beveled on the side facing said copper strip and in the vicinity of said contacting surface whereby to prevent the formation of a spurious gap.

References Cited in the file of this patent

UNITED STATES PATENTS

| | | |
|---|---|---|
| 2,195,192 | Schuller | Mar. 26, 1940 |
| 2,354,176 | Goldsmith | July 18, 1944 |
| 2,484,568 | Howell | Oct. 11, 1949 |
| 2,530,562 | Blaney | Nov. 21, 1950 |
| 2,536,810 | Holmes | Jan. 2, 1951 |
| 2,618,709 | Eckert et al. | Nov. 18, 1952 |
| 2,638,507 | Lombardi | May 12, 1953 |
| 2,649,506 | Gayford | Aug. 18, 1953 |
| 2,763,729 | Camras | Sept. 18, 1956 |
| 2,769,036 | Selsted | Oct. 30, 1956 |
| 2,785,232 | Camras | Mar. 12, 1957 |

FOREIGN PATENTS

| | | |
|---|---|---|
| 693,664 | Germany | July 16, 1940 |